Figure 1:
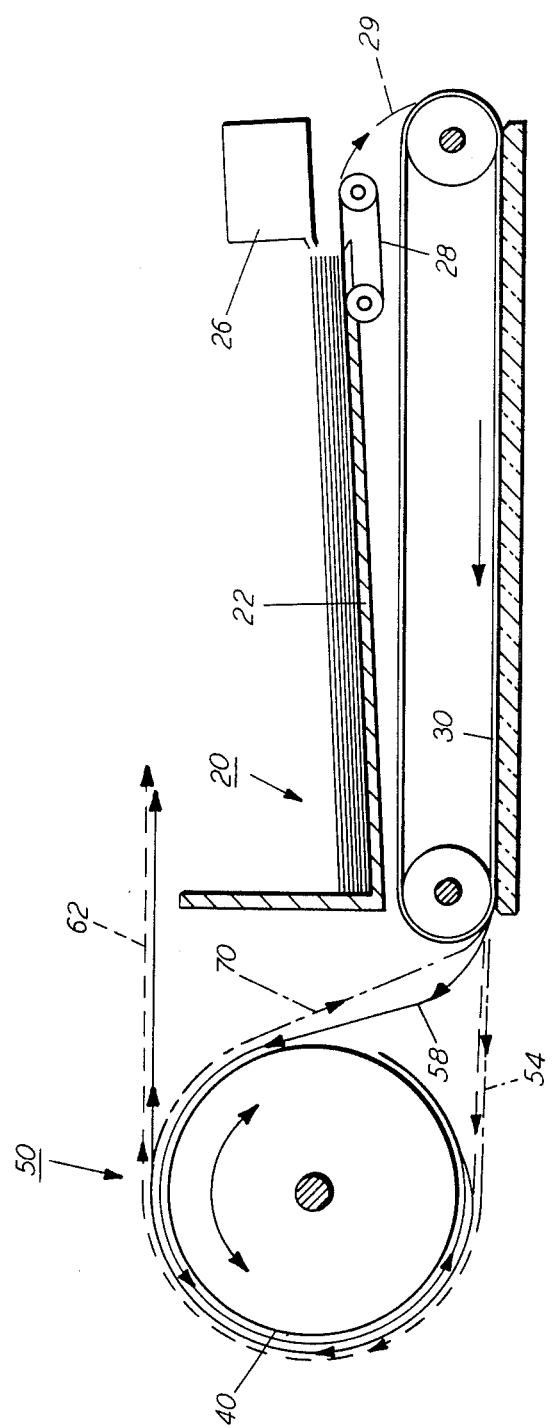

United States Patent [19]

Burger et al.

[11] Patent Number: 4,553,828
[45] Date of Patent: Nov. 19, 1985

[54] RECIRCULATIVE DOCUMENT INVERTER

[75] Inventors: William R. Burger, Fairport; James E. Hutton, Webster; Morton Silverberg, Rochester, all of N.Y.

[73] Assignee: Xerox Corporation, Stamford, Conn.

[21] Appl. No.: 510,122

[22] Filed: Jul. 1, 1983

[51] Int. Cl.[4] .............................................. G03B 27/32
[52] U.S. Cl. ................................ 355/3 BE; 355/3 R; 355/14 SH; 355/14 TR; 355/3 SH; 271/65
[58] Field of Search ............... 355/3 R, 3 BE, 14 TR, 355/14 SH, 23, 24, 25, 26, 3 SH; 271/23, 24, 35, 65, 118, 180, 181, 184, 185, 186, 189, 191, 197, 198, 199, 202, 225, DIG. 9

[56] References Cited

U.S. PATENT DOCUMENTS

| | | | |
|---|---|---|---|
| 3,833,911 | 9/1974 | Caldwell et al. | 355/24 X |
| 3,888,579 | 6/1975 | Rodek et al. | 355/14 SH |
| 4,095,979 | 6/1978 | DiFrancesco et al. | 96/1.4 |
| 4,140,387 | 2/1979 | Gustafson | 355/14 |
| 4,158,500 | 6/1979 | DiFrancesco et al. | 355/14 |
| 4,176,945 | 12/1979 | Holzhauser et al. | 355/14 SH X |
| 4,192,607 | 3/1980 | Hage | 355/14 SH X |
| 4,229,101 | 10/1980 | Hamlin et al. | 355/77 |
| 4,234,180 | 11/1980 | Looney | 271/3.1 |
| 4,262,895 | 4/1981 | Wenthe, Jr. | 271/65 |
| 4,278,344 | 7/1981 | Sahay | 355/14 SH |
| 4,307,958 | 12/1981 | McIrvine | 355/23 |
| 4,313,673 | 2/1982 | Wartinger et al. | 355/14 R |
| 4,330,197 | 5/1982 | Smith et al. | 355/26 X |
| 4,412,740 | 11/1983 | Buddendeck et al. | 355/14 SH |
| 4,419,007 | 12/1983 | Kingsley | 355/26 X |

OTHER PUBLICATIONS

Xerox Disclosure Journal, "Store and Refeed Concept for an Inverter", Nitin M. Sevak, vol. 6, No. 4, Jul.-/Aug. 1981, p. 173.

Primary Examiner—William M. Shoop, Jr.
Assistant Examiner—Shik Luen Paul Ip
Attorney, Agent, or Firm—Paul F. Morgan

[57] ABSTRACT

In a recirculating document handling apparatus for a copier, in which a set of document sheets are sequentially circulated from a stack thereof to the imaging station of the copier and back to the stack, and in which selectable inverting apparatus is provided for inverting or not inverting the document sheets as they are being so circulated and before they are returned to the stack, the latter comprises a large diameter inverting roller adjacent the downstream side of the imaging station, normally rotated in a first direction, and selectably rotated in the reverse direction, and a repositionable wedge-shaped first sheet guide provides in a first position, a document sheet first path from said imaging station around the outside of said inverting roller and towards the stack with the inverting roller driven in the first direction, and said first guide being repositionable to a second position, in coordination with said reverse rotation of said inverting roller in which a document sheet is guided in a second path around the inside of said inverting roller (between the inverting roller means and the imaging station) and then to the outside of the inverting roller, the reverse rotation of the inverting roller being sufficient to rotate the trail edge of a document sheet in this second path past a second guide means adapted to allow the trail edge of the document sheet to flip relative thereto so that upon re-reversal of the inverting roller the document sheet is fed toward the stack trail edge first.

8 Claims, 3 Drawing Figures

RECIRCULATIVE DOCUMENT INVERTER

The present invention relates to an improved selectable inverting system for recirculatory precollation copying of sets of simplex or duplex document sheets.

The present invention is an improvement in simplex/duplex document inverter and precollation copying systems such as U.S. Pat. Nos. 4,330,197 issued May 18, 1982 to Richard E. Smith et al., 4,262,895 issued Apr. 21, 1981 to Stephen J. Wenthe, Jr., 4,176,945 issued Dec. 4, 1979 to R. C. Holzhauser et al., 4,158,500 issued June 19, 1979 to A. B. DiFrancesco, 4,140,387 issued Feb. 20, 1979 to G. B. Gustafson, 4,278,344 issued July 14, 1981 to Ravi B. Sahay, and other art cited hereinbelow. However, the present system is not limited to that apparatus and is usable with various other recirculative document handlers and copiers.

As xerographic and other copiers increase in speed, and become more automatic, it is increasingly important to provide higher speed yet more reliable and more automatic handling of both the copy sheets and the original documents being copied, i.e. both the output and input of the copier. However, the providing of recirculative document copying for precollation copying, especially for duplex (two-sided) document copying, greatly complicates and increases the document sheet and copy sheet handling complexities, as shown by the above and other references.

A particular technology challenge to which the present invention is addressed is the sufficiently rapid but reliable and protective document sheet inversion/non-inversion needed for the compatible circulation of both duplex and simplex documents in the same document handler, since duplex documents must be appropriately rapidly sequentially inverted for copying both sides thereof.

A sheet inverter is a sheet handling component with particular reliability problems. Although a sheet inverter is referred to in the copier art as an "inverter", its basic function is not necessary to immediately turn the sheet over (i.e., exchange one face for the other). Its function is to effectively reverse the sheet orientation in its direction of motion. That is, to reverse the lead edge and trail edge orientation of the sheet. Typically in inverter devices the sheet is driven or fed by feed rollers or other suitable sheet driving mechanisms into a sheet reversing chute. By then reversing the motion of the sheet within the chute and feeding it back out from the chute, the desired reversal of the leading and trailing edges of the sheet in the sheet path is accomplished. Depending on the location and orientation of the inverter in a particular sheet path, this may, or may not, also accomplish the inversion (turning over) of the sheet. In some applications, for example, where the "inverter" is located at a 90° to 180° inherent bend in the copy sheet path, the inverter may be used to actually prevent inverting of a sheet at that point, i.e., to maintain the same side of the sheet face-up before and after this inherent inversion or bend in the sheet path. On the other hand, if the entering and departing path of the sheet, to and from the inverter, is in substantially the same plane, the sheet will be inverted by the inverter. Thus, inverters have numerous applications in the handling of either original documents or copy sheets to either maintain, or change, the sheet orientation. Generally, an inverter is associated with a sheet by-pass path and gate therefor, so that a sheet may selectively enter or by-pass the inverter, to provide a choice of inversion or non-inversion.

Inverters are particularly useful in various systems of pre or post collation copying for inverting the original documents or copy sheets, or for maintaining proper collation of such sheets. For example, changing the facial orientation of the outputted copy sheet enables it to be stacked in a choice of forward or reversed serial page order to maintain collation.

Typically in a reversing chute type inverter, the sheet is fed in and then wholly or partially released from a positive feeding grip or nip into the inverter chute, and then reacquired by a different feeding nip to exit the inverter chute. However, even such a temporary loss of positive gripping of the sheet by any feed mechanism during the inversion process increases the reliability problems of such inverters.

Many inverters, particularly those utilizing only spring action or gravity, have reliability problems in the positive output or return of the sheet at a consistent time after the sheet is released from the inverter. Furthermore, inverter reliability problems are aggravated by variations in the condition or size of the sheet. For example, a pre-set curl in the sheet can interfere with feed-out and even cause the sheet to assume an undesirable configuration when it is released. The use of a curved chute, i.e., curved sheet guides or baffles to define the reversing chamber for the sheet, will not necessarily insure the proper orientation of the trail edge of the sheet relative to the exit nip. Also, different weights or thicknesses of paper will have different beam strengths, i.e. different self-straightening forces.

There are many applications for inverters, such as in over-the-platen document handlers, in which a very compact sheet inverter, with a short-loop arcuate sheet path, would be highly desirable. However a highly arcuate sheet path is considered undesirable as increasing feeding resistance, jamming and possible sheet curling problems, especially for stiffer sheets.

The present system is directed to improving the reliability of the inverter in this and other critical aspects of its operation, yet to also accommodate a range of different sheet sizes within the same inverter and with the same inverting mechanism. The present system provides these improvements with a low cost and simple inverter apparatus having a very short path length for rapid inversion, yet positive control over the sheet movement at all times. The inverter disclosed herein can reliably provide positive sheet control, feeding and ejection for a wide range of sheet dimensions, thicknesses and weights. Further, the inverter disclosed herein allows an arcuate and therefore more compact inverter configuration.

The following terminology is generally used in the description herein: The term "sheet" generally refers to conventional sized fimsy sheets of paper, plastic, or other conventional or typical individual image substrates (original or copy), and not to microfilm or electronic images which are generally much easier to manipulate. However, the terms document, document page, or document image, unless specified as relating to sheets, may also be read as encompassing laser printed or otherwise electronically generated, stored, or rearranged images. The term "page" here generally refers to one side or "face" of a sheet or a corresponding image thereof. A "simplex" document or copy sheet is one having its page and image on only one side or face of the sheet, whereas a "duplex" document or copy sheet has pages on both sides. The term "duplex copying" may be more specifically defined into several different known copying modes. In "duplex/duplex" copying, both sides (both pages) of a duplex document sheet are copied onto both sides of a copy sheet. In "simplex/duplex" copying, the two page images of two successive simplex document sheets are copied onto the opposite sides of a single (duplex) copy sheet. In "duplex/simplex" copying, both sides of a duplex document are copied onto one side of two successive (simplex) copy sheets. In non-duplex copying, i.e. "simplex/simplex" copying, one side of each simplex document is copied onto one side of each copy sheet. In other printing arts, as contrasted to the copier art, two-sided copying may be referred to as "backing-up" rather than duplex copying. A commercially desirable precollation document handling and copying system should compatibly provide all of these copying modes, although "duplex/simplex" need not be provided. The present system is intended to provide for all of said copying modes.

"RDH" is an abbreviation for an automatic recirculating document handler, in which document sheets are automatically fed from a stack, copied and returned thereto, normally for a precollation copying system. The present system is particularly suited for a precollation (multiply recirculated) document copying system, but is also compatible with non-precollation copying with the same apparatus.

Precollation, or collation copying, as it is variably called, is a known desirable feature for a copier, which provides a number of important advantages. In precollation copying any desired number of precollated copy sets may be made by making a corresponding number of recirculations of the original document set in collated order past the copier imaging station and normally copying each document page once or twice each time it circulates past the imaging station. The copies automatically exit the copier in precollated sets, and thus do not require subsequent sorting in a sorter or collator. Proofing and on-line finishing and/or removal of completed copy sets may thus be provided while further copy sets are being made from the subsequent circulations of the same document set.

However, a disadvantage of precollation copying systems is that the set of documents must be recirculated and copied in a predetermined seriatim page order by a number of set circulations equivalent to the desired number of copy sets. Thus, increased document handling is required for a precollation copying system as compared to a post-collation copying system. Also, for duplex copying the copy sheets must normally also be recirculated in the copying path in coordination with appropriately sequenced document inversion in the document set recirculation. Therefore, maximizing document handling automation and copying cycle efficiency is particularly important in precollation copying. If the document handler cannot efficiently and rapidly circulate and copy documents in coordination with copy sheets in the correct order, or must excessively skip documents or copying cycles, the total copying time for completing all of the copy sets will be increased. Also, for collation copying, minimizing the time delay from the initiation of copying until the first copy set is completed and outputted is another important factor. This may be referred to as "first copy set out time".

In contrast, in a post-collation copying system, several identical copies are made at one time from each document page. Collation must be done by each identical copy being placed in a different sorter bin. The document set need only normally be circulated or manually or semi-automatically fed to the imaging station once. Thus, at the end of the document set circulation each utilized bin of the copy sheet sorter or collator contains one copy set. However, the number of copy sets which can be made in one document circulation is limited by the number of available sorter bins. Also, a sorter adds space and complexity and is not well suited for on-line finishing. Further, the "first copy set out time" for any completed sets is delayed for the copying and collating of all the other sets of that copying run. However, post-collation copying, or manual document placement, are desirable in certain copying situations to minimize document handling. Also post-collation can employ slower document handling in that the copying rate is not limited by any document exchange times during the times the plural copies are being made. Thus, it is desirable in some cases that a precollation copying system be compatible with, and alternatively usable for, post-collation or manual document handling as well.

Both forward serial order (1 to N) and reverse order (N to 1) precollation copying of original documents, for both simplex (one-sided) and duplex (two-sided) original documents and copies, is shown in the cited art. Examples of 1 to N, or normal forward serial order, document recirculation systems for precollation simplex or duplex copying systems are disclosed in U.S. Pat. Nos. 4,229,101 to T. J. Hamlin et al., 4,234,180 to J. H. Looney, and 4,355,880 to D. J. Stemmle, and art cited therein.

However, as further explained below, N to 1 (reverse order) document set circulation is commercially more conventional for systems feeding documents from a tray positioned over a platen of a copier. In such conventional systems the set of documents is loaded (stacked) face-up, and each document sheet is fed out from the bottom of the stack, copied, and restacked back on the top of the stack. Thus the simplex documents are circulated in an endless loop by being turned over, copied, turned over again, and returned back to the top of the stack over the platen.

N to 1 document recirculation has been commercially utilized in spite of certain disadvantages, because bottom feeding and top restacking is preferred for a "racetrack" document circulation path. The documents may be recirculated in a short over-platen loop to and from a document stack located over the copier platen, and the entire RDH may be in a pivotal platen cover unit. Documents can be fed from one edge of the stack to the same side or edge of the platen underneath the stack, and then back from the opposite edge of the platen to the opposite edge of the stack. The documents may be stream fed unidirectionally over the platen. One document may be fed on while the prior document is feeding off. The document path has a short 180° loop turn above each side of the platen. With a shorter and unidirectional document recirculation path, document transport speeds can be lower and/or the number of copy pitches skipped in copying small (2–6) sheet document sets can be reduced.

Another form of collated duplex copying usable with the present system is disclosed, for example, in U.S. Pat. No. 4,095,979 issued June 20, 1978 to A. B. DiFrancesco et al. In the latter type of duplexing system each copy and document sheet is turned over immediately for its second side image.

Some examples of further details of N to 1 or racetrack type recirculating document handlers are disclosed in U.S. Pat. Nos. 4,324,395 issued Apr. 15, 1982 to Morton Silverberg; 4,335,954 issued June 22, 1982 to Russell L. Phelps; 4,270,746 issued June 2, 1981 to T. J. Hamlin and 4,076,408 issued Feb. 28, 1978 to M. G. Reid, et al.

The anonymous Disclosure Number 19015 at page 61 of the "Research Disclosure" published February, 1980 by Industrial Opportunities, Ltd., Homewell, Havant, Hampshire, U.K. is of interest as suggesting that when duplex original documents are being recirculatively copied onto duplex copy sheets in a copying system where the duplex documents must be immediately inverted each time for copying opposite sides in immediate sequence, that the consequent copying speed loss can be compensated for to some extent by making two consecutive copies of the same original each time. However, it requires 2 copy receiver trays.

Even further details for an exemplary copier usable herewith are disclosed in the following pending U.S. patent applications and foreign equivalents thereof: Ser. No. 372,581 filed Apr. 28, 1982 re optics; Ser. Nos. 420,965; 420,993 and 421,006 re controls, all filed Sept. 21, 1982; Ser. No. 420,966 filed Sept. 20, 1982 re copy sheet feeders; and Ser. No. 193,228 filed Oct. 2, 1980 and Ser. No. 443,799 filed Nov. 22, 1982 [and U.S. Pat. No. 3,856,295 issued Dec. 24, 1974 to J. H. Looney] re copy sheet inverters. Another inverter is shown in IBM Technical Disclosure Bulletin Vol. 18, No. 1, June 1975, p. 40.

Examples of various other patents teaching known document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270 and 4,335,949. Conventional simple software instructions in a copier's conventional microprocessor logic circuitry and software of document handler and copier control functions and logic, as taught by the above and other patents and various commercial copiers, are well known and preferred. However, it will be appreciated that the document handling and other functions and controls described herein may be alternatively conventionally incorporated into a copier utilizing any other suitable or known simple software or hard wired logic systems, switch controllers, etc. Such software for functions described herein may vary depending on the particular microprocessor or microcomputer system utilized, of course, but will be already available to or readily programmable by those skilled in the art without experimentation from the descriptions and references provided herein.

The control of the exemplary document handling systems disclosed herein may be accomplished by conventionally activating them by signals from the controller direct or indirectly in response to simple programmed commands and from selected activation or non-activation of conventional copier switch inputs by the copier operator, such as switches selecting the number of copies to be made in that run, selecting simplex or duplex copying, selecting whether the documents are simplex or duplex, selecting a copy sheet supply tray, etc. The resultant controller signals may conventionally actuate various conventional electrical solenoid or cam controlled sheet deflector fingers, motors or clutches in the copier in the selected steps or sequences as programmed. Conventional sheet path sensors, switches and bail bars, connected to the controller, may be utilized for counting and keeping track of the positions of documents and copy sheets, as is well known in the art, and taught in the above and other patents and products. Known precollation copying systems utilize such conventional microprocessor control circuitry and connecting switches for counting the number of document sheets as they are circulated, counting the number of completed document set circulations, and thereby controlling the operation of the document and copy sheet feeders and inverters, etc.

All references cited herein, and their references, are incorporated by reference herein for appropriate teachings of additional or alternative details, features, and/or technical background.

The present invention desirably overcomes or reduces various of the above-discussed problems.

A general feature herein is to provide a more reliable inverter/non-inverter system in a recirculating document handling system.

A preferred specific feature disclosed herein is to provide a recirculating document handling apparatus for a copier, in which a set of document sheets are sequentially circulated from a stack thereof to the imaging station of the copier and back to the stack, and in which selectable inverting means are provided for inverting or not inverting the document sheets as they are being so circulated and before they are returned to the stack, the improvement in said selectable inverting/non-inverting means comprising: a large diameter inverting roller adjacent the downstream side of said imaging station; means for normally rotating said inverting roller in a first direction, and for selectably rotating said inverting roller in the reverse direction; repositionable first sheet guide means for guiding, in a first guide position, a document sheet in a first path from said imaging station around the outside of said inverting roller and towards the stack with said inverting roller driven in said first direction; said first guide means being repositionable to a second position, in coordination with said reverse rotation of said inverting roller, in which a document sheet is guided in a second path around the inside of said inverting roller (between said inverting roller and said imaging station) and then to the outside of said inverting roller; said reverse rotation of said inverting roller being sufficient to rotate the trail edge of a document sheet in said second path past a second guide means; said second guide means being adapted to allow the trail edge of a document sheet fed therepast in said second path to flip relative to said second guide means so that upon re-reversal of said inverting roller to said first direction of rotation said document sheet is fed toward said stack trail edge first by said inverting roller and not towards said platen.

Further features which may be provided by the method and apparatus disclosed herein, individually or in combinations, include those in which said second guide means is positioned in the document sheet path between said inverting roller and said stack; in which the height of said inverting roller corresponds generally to the height of said stack over said platen and is directly adjacent both; in which plural independent endless web members are mounted to partially wrap around at least a substantial portion of the outside of said inverting roller and move therewith and to provide two spaced apart sheet receiving nips for receiving original sheets in said first and second paths respectively, and for holding sheets against the outside of said inverting roller for movement therewith in both said first and second paths; wherein said first guide means is a wedge-shaped member having three different document sheet path control surfaces for controlling the movement of document sheets to and around said inverting roller; wherein two of said sheet path control surfaces are concave surfaces extending upwardly to a common apex and having a curvature corresponding to that of that inverting roller; wherein said inverting roller has a circumference corresponding to the maximum length of the document sheets being handled thereby in the movement direction of the document sheets; and in which said selectable inverting/non-inverting means provides a total document sheet path length which is only slightly longer in the direction of document movement than the dimensions of the largest document sheet to be handled thereby, but providing a large radius of curvature of sheets therein to minimize document resistance and curling of the document sheets.

Figure 2:
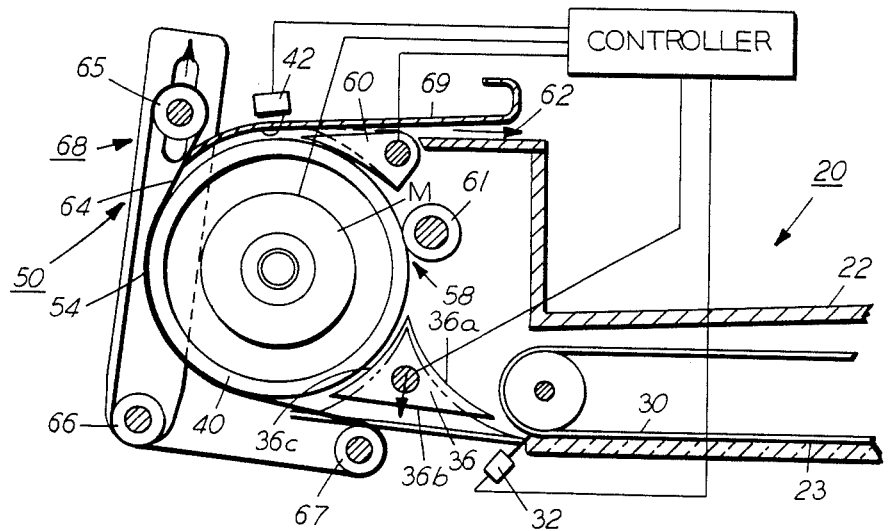
Figure 3:
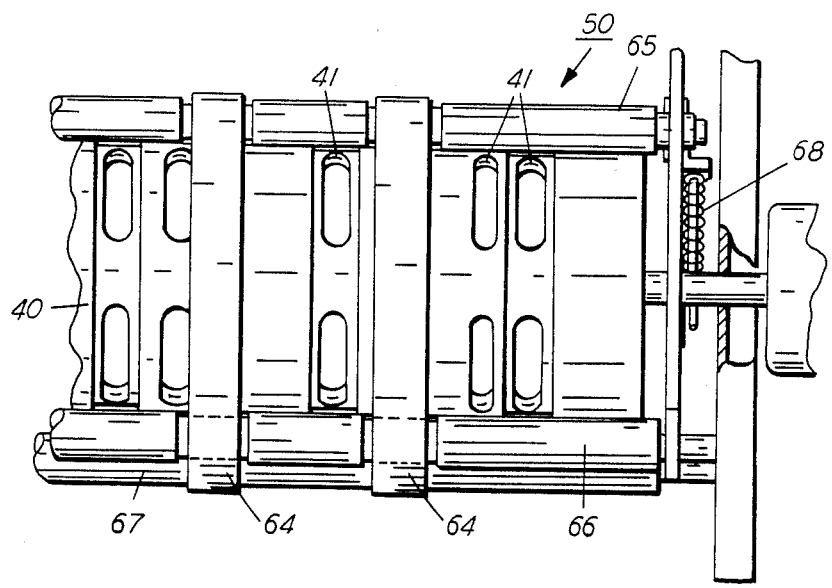

Various of the above-mentioned and further features and advantages will be apparent from the examples described hereinbelow of specific apparatus and steps of operation. The invention will be better understood by reference to the following description of one specific embodiment thereof, which includes the following drawing figures (approximately to scale) wherein:

FIG. 1 is a schematic (path illustration) side view of an exemplary recirculating document handler for a copier with which the present invention may be practiced, and FIG. 2 is a side view of the inverter/non-inverter apparatus for the RDH of FIG. 1; and FIG. 3 is a partial end view of the apparatus of FIG. 2.

Referring to the RDH unit 20 shown in the Figures, it will be appreciated that this is merely one example, and that various other alternative recirculating document feeding units may be utilized with the present invention, including various ones disclosed in the above-cited references.

In the exemplary N to 1 order recirculating document handler (RDH) 20 disclosed here, individual original document sheets are sequentially fed from a stack of document sheets placed by the operator face-up in normal forward collated order in the document stacking and holding tray 22, i.e. with page 1 on the top of the stack. Document sheets are fed from the bottom of the stack seriatim to the imaging station 23, which is the conventional copying platen of a copier, to be conventionally imaged onto a photoreceptor for the production of copies in a generally conventional xerographic manner. The documents are stacked initially, and also restacked automatically during each circulation, in the tray 22 over the platen 23. The document (feeder) 20 has conventional switches or other sensors for sensing and counting the individual documents fed from the tray 22, i.e. counting the number of document sheets circulated. A conventional resettable bail or finger (not shown) drops to indicate through its associated set-counter switch or sensor the completion of each circulation of the complete document set, by sensing that all the documents have been fed out from under it, and then is automatically reset on the top of the stack before the next circulation. The recirculating document feeder 20 is adapted to continually serially recirculate the documents until a selected number of copy sets is made therefrom. The document sheets may be various conventional sizes and weights of sheets of paper or plastic containing information indicia to be copied on one or both sides, e.g. printed or typed letters, drawings, prints, photographs, etc. An air knife 26 and bottom feeder 28 feeds from the stack the bottom-most document sheet, on demand by the controller, through a common, single inversion, feed path 29 to a platen transport 30 which moves the document over the copier platen 23 into a registration position where the side of the document facing the platen 23 is copied. This may optionally include a registration gate 32.

The description herein particularly relates to a novel invert/non-invert system 50 for providing the selected proper number of inversions for simplex documents and duplex documents. In the RDH system 20 disclosed herein, this system 50 is at the downstream side of the platen i.e. in the return path of the documents from the platen 23 to the tray 22. As shown in the above cited U.S. Pat. No. 4,278,344 an inverter system may alternatively be located at the upstream side, where in this system there is located a simple single inversion path 29. However the present system is particularly adapted to provide improved operation and document sheet handling at said downstream location for restacking of the documents therefrom, as will be further described herein. There are advantages for such a downstream inverting system including the fact that a duplex document may be more rapidly and accurately fed onto the platen while a previous document can be simultaneously inverted in its return for restacking to the tray 22.

In the disclosed RDH 20 each document sheet is selectably inverted or not inverted as it is fed back to the tray 22 from the imaging station 23 by the invert/non-invert system 50. The system 50 provides a choice of paths selectable by the controller. That is, a simplex document path 54 and a duplex document path 58. While this is normally accomplished after the document has been copied, this may also be accomplished after the document has been fed from the platen without being copied thereon, in certain recirculating sequences. The system 50 includes a selectably reversible sheet drive roller (inverting roller) 40 operating in cooperation with selectable position gates or deflectors 36 and 60 in the document path. In the present system the simplex document path 54 is the dashed line path in FIG. 1 comprising uninterrupted movement around the *outside* of the roller 40 while the roller 40 is driven only in one direction (clockwise in FIGS. 1 and 2). This feeds each document sheet through the first (simplex) document path 54 from the platen 23 to the tray 22 with only one inversion.

In contrast, it may be seen from the solid line path in FIG. 1 that the duplex path 58 passes around the *inside* of the roller 40, which is the side of the roller 40 adjacent the tray 22 and the platen 23. In this path the roller 40 is reversed after the trail edge of the entire document sheet has passed under the ends of the fingers of the invert gate 60. These fingers of the gate 60 are designed to be lowered into grooves in the roller 40 after the document sheet has passed this gate so that when the roller 40 is then reversed it will insure stripping of the sheet from the roller into a restacking path 62 to the tray 22. Note that the restacking path 62 is the same for both the simplex path 54 and the duplex path 58. The switch 42 or the like can be utilized to sense this passage of the trail edge of the sheet past gate 60 and initiate the reversal of roller 40. The above described dropping of the gate 60 fingers can be by gravity, or positively by solenoid operation. The movement of the document sheet with the movement of the surface of the roller 40 in path 58 is preferably assisted by pinch roller 62 intermediately thereof pressing the document sheet thereagainst. The pinch roller 61 may be a single resilient roller or, preferably, a plurality of individual idler rollers on a common shaft.

The initial lifting of the deflector fingers 60 for the initial passage thereunder of the sheet in this duplex path 58 may be simply by the deflection of the fingers if they are sufficiently lightweight, by the lead edge of the sheet. However preferably the fingers are lifted by a solenoid, which may be commonly connected to also lift gate 36.

The initial selection of path 54 versus 58 is made here by a choice of two different vertical positions of the lower or first gate 36. The downward and upward movement of the gate or guide member 36 is coordinated with the direction of rotation of the inverting roller 40. The gate 36 has a first curved guide surface 36a which extends from directly adjacent the output of the platen transport 30 at the downstream edge of the platen 23 up to closely adjacent the midpoint (vertically) of the inside surface of the roller 40 when this gate 36 is in its lowered position, shown by the dashed line position in Fig. 2. Thus, in this lowered position of gate 36 document sheets enter the duplex path 58.

With the gate 36 in said down position all documents are deflected around the inside of the roller 40 in the path 58. But with the gate 36 in its normal up position, as illustrated by the solid line position in FIG. 2, the documents being fed off of the platen 23 by the transport 30 are fed *under* this gate 36. In that case the documents pass between a generally horizontal planar or slightly concave guide surface 36b on the bottom of the gate 36 and an opposing fixed guide plate or baffle therebelow (on which the gate 36 can rest in its lower position). Thus when the gate 36 is raised by its solenoid spring return or other actuator all of the document sheets are fed into the simplex path 54 around the outside of the roller 40.

Positive feeding of the documents with the movement of the roller 40 surface is insured here for both paths 54 and 58 by a plurality of belts 64 which are mounted on idler rollers 65, 66 and 67 so as to wrap around the outside of the roller 40 and move therewith. The idler rollers 67 are positioned so that a bottom entrance nip of the idler belts 64 with the roller 40 occurs immediately downstream of the gate 36 at the bottom of the roller 40. The belts 64 then wrap around the outside of the roller 40 in intimate, document sheet holding, contact therewith up to adjacent the top of the roller 40 to an upper nip position controlled by the idler rollers 65. Preferably the idler rollers 65 are on an independently positionable shaft mounting which is spring-loaded, to provide a belt tensioning system 68. An upper fixed guide 69 then defines a sheet path from this upper or release nip of the belts 64 with the roller 40 to the downstream end of the restack path 62, at which point the sheets are released for settling and restacking in the tray 22. Thus the belts 64 provide two widely spaced-apart sets of plural nips with the roller 40, a lower set of nips at the bottom of the roller 40 for receiving sheets into the simplex path 54, and an upper set of nips on the outside of the roller 40 for receiving the lead edge of a document sheet into the duplex path 58, used for releasing sheets from the ends of both paths 54 and 58.

It may be seen that the only sheet driving member required is the single large roller 40 itself. All other movable members, i.e. the belts 64, their idler rolls 65, 66 and 67 and the pinch roller 61 are all driven directly by the surface of the roller 40 or by the document sheet thereon.

Additional driven pinch rolls may be provided at the exit of the restack path 62 into the tray 22. However they are not required here due to the very compact and short path lengths of the overall invert/non-invert system 50.

The inverter roller 40 is preferably a large diameter but thin walled tube, which is of plastic or lightweight metal. This tube forming the roller 40 preferably is highly apertured with large apertures 41 as illustrated in FIG. 3 so as to even further reduce the mass and rotational inertia thereof. This enables the roller 40 to be rapidly reversed in its direction of rotation with a relatively small reversible motor M drive for the duplex path 58. The large areas of the apertures 41 in the roller 40 also prevent air from being trapped between the document sheet and the surface of the roller 40 during high speed operation, and can provide improved traction or gripping of the sheet thereby.

As described above, the roller 40 is reversed when the trail edge of a sheet in the path 58 passes the invert gate 60, and is then reversed again after this sheet has been driven out past the tips of the same gate 60 for the feeding in of the next document sheet to be inverted. Note that this second reversal does not need to occur until the next document sheet in path 58 has reached the nip between the pinch roll 61 and the roller 40 with this system. Accordingly, there is very little interdocument pitch or timing gap needed even in the duplex path 58.

In the simplex path 54, there is no reversal required for the inverter roller 40 and the gates 36 and 60 do not change position, i.e. gate 60 remains down at all times while gate 36 remains up.

It may be seen that the inverter roller 40 here desirably corresponds generally to the vertical height of the restacking path 62 above the platen 23, and is directly adjacent to both. Also, the top of the roller 40, where the sheets are released corresponds generally to at least the height of the highest level of the stack of document sheets which will be stacked in the tray 22 over the platen. The vertical lifting of the sheet occurs in its positive drive by roller 40 while held thereagainst by the belts 64. In fact the majority of the sheet path lengths in the system 50 are in this positively controlled mode.

An important feature of the above-described duplex path 58 is that since the sheet is wrapped around the roller 40 from the inside to the outside, and since the trail edge of the sheet releases from underneath the gate 60 at a point where it is still wrapped around the roller 40 but facing the entrance to the restack path 62, that through the inherent beam strength of the sheet, said trail edge will inherently flip up against the upper fixed guide 69, i.e. flip away from the gate 60, which is spaced below this guide surface 69. Thus, when the roller 40 is reversed, the trail edge of the sheet is positively held away from possible contact with stripper fingers 60 by its beam strength. This upward flipping of the trail edge of the document insures that upon reversal of the roller 40 to its normal direction of rotation the document sheet is fed toward the stack of documents in the tray 22 trail edge first and not back through its original path toward the platen. This is also true for the lead edge of a document sheet as it passes over the stripper fingers 60 in the simplex path 54. In fact, it may be possible thereby to eliminate moving gate 60 and replace it with a fixed guide surface or baffle. Note that with this system a duplex document exits its path 58 to the tray 22 from the same position and with the same curvature as a simplex document exiting path 54.

Due to the opposite direction of curvature of guide surface 36a of the lower or first gates 36, the lead edge of the document sheet is positively driven against that surface 36a and then positively driven against the inside surface of the roller 40, in the initial movement of the document sheet in the duplex path 58. This also provides positive sheet control against the desired guiding surfaces. It also provides a known, positively controlled, direction of buckling or curvature of the sheet, which greatly increases its beam strength for feeding and handling.

The same above-described invert/non-invert system 50 may also be utilized to provide an optional third mode of operation, providing an immediate duplex path 70, illustrated by the dot/dash path shown in FIG. 1. This immediate duplex path 70 preferably operates in the same manner as the simplex path 54 as far as the initial sheet movement and the unidirectional driving of the inverter roller 40. That is, the document, a duplex document in this case, passes around the outside of the roller 40 until it reaches the top thereof. The path 70 then differs from path 54 in that in this mode the invert gate (stripper fingers) 60 are raised to intercept the lead edge of the document and continue the document down around the inside of the roller 40, under the pinch roll 61, and back to the platen 23. This, thus immediately returns the document for copying on the second side on the platen 23. The platen transport 30 must then of course be reversed to move the document back onto the platen for its second side copying. Then after the second side is copied the document will be returned to the tray 22, preferably through the simplex path 54, or through the path 58. For this third mode of operation, the registration gate 32 may be adapted to reregister the lead edge of the document as it reenters the platen for its second side copying, as by buckling the lead edge of the document thereagainst when the registration gate 32 is raised.

As previously noted, the same backup belts system 64 is utilized in the duplex path 58 as in the simplex path 54, and in the path 58 the belt nip is entered shortly after passing gate 60. Thus, at the critical feeding point when reversal of the roller 40 occurs, almost all of the duplex document will be securely held between the full wrap length of belts 64 and the outside of the roller 40, and therefore cannot skew, misfeed or slip. There is no obstruction to the end of the document sheet being reversed in the path 58. The roller 40 is simply initially rotated by whatever amount is sufficient to wrap up that particular duplex document, irrespective of its length. A third surface 36c of the gate 36 provides a closely spaced guide baffle for the extended lead edge portions of larger sheets where the amount of said wrapping around the roller 40 exceeds the belts 64 contact therewith. Thus the length of the document which can be reversed with this system is effectively equal to almost the entire circumference of the roller 40, if desired. It will be noted that this surface 36c on the gate 36 could be replaced by a fixed curved baffle spaced from roller 40 for the same function, if desired. Also note that the separation of the two surfaces 36a and 36c insure separation and non-interference from the trail edge of sheets being reversed with incoming sheets on surface 36a.

The two surfaces 36a and 36c preferably have radii of curvature corresponding to that of the surface of the cylinder 40. Thus the maximum curvature of any sheet being handled throughout either of the two paths 54 or 58 need not exceed that of the large radius of the roller 40. This overcomes a problem with small radius inverters, which tend to have problems of inducing curl in the sheet and increased jam rates due to the higher resistance of small radius turns for the sheet. To this end the diameter of the roller 40 is made as large as possible here, corresponding substantially to the overall height of the RDH unit 20. Yet with this system this is compatible with a sheet path which is as short as possible.

By making the diameter of roller 40 more than approximately 9.3 cm the circumference thereof is more than approximately 29 cm, which is more than ample for the handling in duplex path 58 of sheets having a width of 10½ inches or more in their movement direction. This allows handling of most U.S. and international sheet sizes with the system 50. It also insures that the total path length is not substantially greater than this sheet dimension length for minimum inverting time. Further the space required for this inverting function (path 58) is not substantially greater than that required just for simplex document handling (path 54).

Note that the path-selecting gate 36 here is a small wedge-shaped member in which the two surfaces 36a and 36c converge upwardly towards a common apex from the generally horizontal bottom surface 36b. Also, all three surfaces 36a, b and c are active sheet guiding surfaces.

To summarize its function, this compact dual (selectable) return path apparatus 50 may be called an "inverter" even though for path 58 the document is not inverted at this point. The duplex document transport path 58 provides no sheet inversion between the stack and the platen, whereas the simplex transport path 54 inverts the document sheet (once) between the stack and the platen. Yet the path 58 provides for inversion of duplex documents for copying both sides of a duplex document set because of the inherent inversion in the path 29. In the inverter operation for path 58, the reversal of the roller 40 allows the document sheet to only go partially around the roller 40 and then be reversed in direction and fed back over the gate 60. The now lowered gate 60 (as shown in its solid line position in FIG. 2) allows the document into the path 62 which feeds directly to the tray 22. Thus, in this non-inverting or duplex path 58, the documents arrive at the tray 22 with the same orientation as their orientation on the platen, but inverted from their original orientation in the tray 22. In contrast, the simplex document inverting transport path 54 transports the documents unidirectionally and without reversal around the roller 40 directly to the tray 22. This inherently inverts them once, reversing the inversion provided by path 29. Thus, the orientation or facing of documents fed through the simplex path 54 and restacked is the same as the previous orientation of those documents in the tray 22.

Thus, in the total circulation path from the bottom of the tray 22 back to the top thereof, with the selection of the transport path 54 the documents are inverted twice (once at each end of the platen) whereas with the selection of the transport path 58 the documents are only inverted once, at the upstream end of the platen. Therefore, it may be seen that the reversal or non-reversal of the roller 40 and the coordinated actuation or non-actuation of the gates 36 and 60 therewith during a document set circulation determines whether that set of documents will be recirculated with a total of one or two total inversions in that circulation. In either case, since the documents can be continuously sequentially restacked simultaneously with continuous sequential feeding by the feeder 28, continuous multiple recirculations can be provided for precollation copying.

While the simplex/duplex document inverting/non-inverting recirculating system embodiment disclosed herein is preferred, it will be appreciated that this embodiment is but one example, and that various alternatives, modifications, variations or improvements thereon may be made by those skilled in the art from this teaching which are intended to be encompassed by the following claims:

What is claimed is:

1. In a recirculating document handling apparatus for a copier, in which a set of document sheets are sequentially circulated from document stacking means to the imaging station for the copier and back to said stacking means, and in which selectable inverting means are provided for inverting or not inverting the document sheets as they are being so circulated and before they are returned to said stacking means, the improvement in said selectable inverting/non-inverting means comprising:

large diameter inverting roller means adjacent the downstream side of the imaging station extending vertically from said imaging station to above said stacking means for feeding of documents between the imaging station and said stacking means, said inverting roller means having a surface circumference greater than the maximum length of said document sheets in the movement direction of said document sheets, means for normally rotating said inverting roller means in a first direction of rotation, and for selectably rotating said inverting roller means in the reverse direction of rotation, repositionable first sheet guide means for guiding, in a first guide position, a document sheet in a first path from said imaging station around the outside of said inverting roller means and then towards said stacking means with said inverting roller means driven only in said first direction, said first path returning document sheets to said stacking means in their original orientation therein without inversion, retaining means for retaining document sheets against the outside of said inverting roller means, said first guide means being repositionable to a second position, in coordination with said selectable reverse rotation of said inverting roller means, in which a document sheet is guided in a second path around the inside of said inverting roller means (between said inverting roller means and the imaging station) and then to the outside of said inverting roller means with said roller means being driven in said reverse direction of rotation, second guide means defining a third document sheet path from said inverting roller means to said stacking means, said inverting roller means being automatically re-reversed in rotation to said first direction of rotation after the trail edge of a document sheet in said second path has passed said second guide means and before said document sheet has been completely rotated around said inverting roller, said second path and said second guide means automatically causing the trail edge of a document sheet fed therepast in said second path to flip relative to said second guide means while said document sheet is held by said retaining means so that upon said re-reversal of said inverting roller to said first direction of rotation said document sheet is automatically fed into said third path toward said stacking means trail edge first by said inverting roller means, and wherein said first path returns document sheets to said document restacking means through said same third path lead edge first, said selectable inverting/non-inverting means providing a very short total document sheet path length yet providing a large minimum radii of curvature of all document sheets in all of said first, second and third document paths to minimize document sheet feeding resistance or curling.

2. The apparatus according to claim 1 in which said second guide means is closely adjacent the upper surface of said inverting roller means at the entrance to said third document sheet path between said inverting roller means and said stacking means.

3. The apparatus according to claim 1 in which the height of said inverting roller means corresponds generally to the maximum document stacking height of said stacking means over said imaging station and is closely adjacent to both.

4. The apparatus according to claim 1 in which said retaining means comprises plural independent endless web members mounted to wrap around at least a substantial portion of the outside of said inverting roller means and driven thereby to provide two spaced apart sheet receiving nips for receiving said document sheets in said first and second paths respectively, and for holding said document sheets against the outside of said inverting roller means for movement therewith in both said first and second paths.

5. The apparatus according to claim 4 in which the height of said inverting roller means corresponds generally to the maximum document stacking height of said stacking means over said imaging station and is closely adjacent to both.

6. The apparatus according to claim 1 wherein said first guide means is a single wedge-shaped member extending between said imaging station and said inverting roller means having three different operative document sheet path control surfaces on three sides thereof for selectably controlling the movement of document sheets to and around said inverting roller means in both said first and second paths, one said control surface being adjacent to but spaced from said inverting roller means to provide a document sheet path therebetween.

7. The apparatus according to claim 6 in which two of said three document sheet path control surfaces are concave surfaces extending upwardly to a common apex and having a curvature corresponding to the surface of said inverting roller means.

8. In the method of recirculating document sheets to the imaging station of a copier for copying, in which document sheets are sequentially circulated from a stack thereof to the imaging station of the copier and back to said stack and in which alternatively selectable inverting/non-inverting steps are provided for selectively inverting or not inverting the document sheets as they are being so circulated and before they are returned to said stack, the improvement in said selectable inverting/non-inverting steps utilizing a large diameter inverting roller adjacent the downstream side of the imaging station and sheet guide means adjacent said inverting roller wherein:

said non-inverting step comprises feeding document sheets from the imaging station in a first path around the outside of said large diameter inverting roller and directly to said stack from said same large inverter roller by rotating said inverting roller only in a first direction of rotation, said non-inverting step returning those document sheets to said stack in their original orientation in said stack, said inverting step comprising rotating said large diameter inverting roller in a second, opposite, direction of rotation and feeding document sheets in a different, second, path, said second path including first a concave path on the inside of said large diameter inverting roller, between said inverting roller and the imaging station, and then a convex path to the outside of said inverting roller, while forcibly retaining a portion of a document sheet against said outside of said inverting roller, said document sheet being fed in said convex portion of said second path a sufficient distance to rotate the trail edge of that document sheet past said sheet guide means adjacent said inverting roller, said trail edge of said document sheet in said convex portion of said second path then being automatically flipped from one side to the other of said sheet guide means while said document sheet is so forcibly retained, and then automatically re-reversing the direction of rotation of said large diameter inverting roller to said first direction of rotation to feed said document sheet directly from said inverting roller to said stack trail edge first from said other side of said sheet guide means, to return said document sheet to said document stack inverted from its original orientation therein to complete said inverting step.

* * * * *